(12) United States Patent
Blessum et al.

(10) Patent No.: US 8,833,183 B2
(45) Date of Patent: Sep. 16, 2014

(54) METHOD AND SYSTEM FOR MONITORING BEND AND TORQUE FORCES ON A DRILL PIPE

(75) Inventors: Dustin L. Blessum, Perry, OK (US); Michael F. Gard, Perry, OK (US); Kendall C. Young, Stillwater, OK (US)

(73) Assignee: The Charles Machine Works, Inc., Perry, OK (US)

( * ) Notice: Subject to any disclaimer, the term of this patent is extended or adjusted under 35 U.S.C. 154(b) by 580 days.

(21) Appl. No.: 13/165,418

(22) Filed: Jun. 21, 2011

(65) Prior Publication Data

US 2011/0308332 A1 Dec. 22, 2011

Related U.S. Application Data (60) Provisional application No. 61/356,863, filed on Jun. 21, 2010.

(51) Int. Cl.
*G01L 1/24* (2006.01)
*G01B 11/16* (2006.01)

(52) U.S. Cl.
CPC .. *G01L 1/24* (2013.01); *G01B 11/16* (2013.01)
USPC .................................................. 73/862.624

(58) Field of Classification Search
USPC .................................................. 73/862.624
See application file for complete search history.

(56) References Cited

U.S. PATENT DOCUMENTS

| 3,791,043 | A | * | 2/1974 | Russell | 33/312 |
|---|---|---|---|---|---|
| 4,291,978 | A | * | 9/1981 | Seigel | 356/139.06 |
| 6,176,323 | B1 | * | 1/2001 | Weirich et al. | 175/40 |
| 7,503,403 | B2 | * | 3/2009 | Jogi et al. | 175/45 |
| 7,528,946 | B2 |  | 5/2009 | Gunsaulis |  |
| 7,557,339 | B2 | * | 7/2009 | Poland et al. | 250/227.14 |
| 7,584,808 | B2 | * | 9/2009 | Dolgin et al. | 175/45 |
| 7,591,188 | B2 | * | 9/2009 | Allen et al. | 73/825 |
| 8,160,853 | B2 | * | 4/2012 | Mitchell | 703/10 |
| 8,594,987 | B2 | * | 11/2013 | Mitchell | 703/10 |
| 2006/0157278 | A1 | * | 7/2006 | Dolgin et al. | 175/45 |
| 2007/0188742 | A1 | * | 8/2007 | Gunsaulis | 356/138 |

* cited by examiner

*Primary Examiner* — Freddie Kirkland, III
(74) *Attorney, Agent, or Firm* — Tomlinson Rust McKinstry Grable (57) ABSTRACT

A system and method for monitoring bend radius and torque force exerted on a drill string. A sensor system is supported within a pipe section of the drill string and has a light source supported within the pipe section to emit a light beam within the pipe section. An optical sensing device is supported within the pipe section and spaced apart from the light source. The optical sensing device transmits a detection signal indicative of the position of the light beam on a surface of the optical sensing device to a processor that determines the bend radius and torque force exerted on the pipe section.

32 Claims, 6 Drawing Sheets

METHOD AND SYSTEM FOR MONITORING BEND AND TORQUE FORCES ON A DRILL PIPE

CROSS-REFERENCE TO RELATED APPLICATIONS

This application claims the benefit of U.S. Provisional Patent Application No. 61/356,863 filed Jun. 21, 2010, the contents of which are incorporated herein by reference.

FIELD OF THE INVENTION

The present invention relates generally to installation of underground utilities and specifically to a system for monitoring of forces exerted on drill pipe during operation of a drill rig.

SUMMARY OF THE INVENTION

The present invention is directed to a system for monitoring a force exerted on a pipe section. The system comprises a light source supported within the pipe section to emit a light beam within the pipe section, an optical sensing device supported within the pipe section and spaced apart from the light source, and a processor. The optical sensing device transmits a detection signal indicative of the position of the light beam to a surface of the optical sensing device. The processor receives the detection signal and processes the detection signal to determine the force exerted on the pipe section.

The present invention is further directed to a system for monitoring a force exerted on a pipe section. The system comprises an elongate cylindrical housing having a first end and a second end, a light source is supported at the first end of the housing to emit a laser beam within the housing, a semiconductor array is disposed at the second end of the housing to detect the laser beam, and a semi-transparent, non-refractive medium is supported within the housing between the light source and the array. The array transmits a detection signal indicative of the position of the laser beam on a surface of the array.

The present invention further includes a directional drilling system comprising a drive machine, a drill string comprising a first end and a second end, wherein the first end is operatively connected to the drive machine, a downhole tool assembly connected to the second end of the drill string for movement therewith, a sensor assembly, and a processor. The sensor system is disposed along the drill string to measure bend radius and torque force exerted on the drill string. The sensor system comprises a light source supported within the pipe section to emit a light beam within the pipe section and an optical sensing device supported within the pipe section and spaced apart from the light source, wherein the optical sensing device transmits a detection signal indicative of the position of the light beam on a surface of the optical sensing device. The processor receives the detection signal and processes the detection signal to determine the forces exerted on the pipe section.

The invention is also directed to a method for determining bend radius and torque forces exerted on a pipe section during drilling operations. The method comprises transmitting a light beam from a light source disposed within the pipe section and detecting the light beam with an optical sensing device supported within the pipe section. A detection signal indicative of the position of the light beam on the optical sensing device is generated and transmitted to a processor. The detection signal is processed to determine the torque force or bend radius of the pipe section.

DESCRIPTION OF THE INVENTION

Horizontal directional drilling (HDD) permits installation of utility services or other products underground in an essentially "trenchless" manner, eliminating surface disruption along the length of the project and reducing the likelihood of damaging previously buried products. The typical HDD bore path begins from the ground surface as an inclined segment that is gradually leveled off as the desired product installation depth is neared.

HDD has proven to be a useful method for the installation of numerous types of underground utilities—such as telephone and electric lines and gas, water, and gravity flow conduits. The ever increasing population of in situ utilities has created a need for accurate and dependable steering systems to steer around existing utilities. These steering systems, however, are often limited by the bend radius and torque limitations of the drill pipe used in the drilling operations. Thus, HDD systems sometimes are damaged as a result of exceeding bend radius and/or torque limitations. Accordingly, a need to monitor the bend radius and torque forces exerted on the drill string during boring operations has arisen. The present invention teaches a system and method for monitoring such forces.

Figure 1:
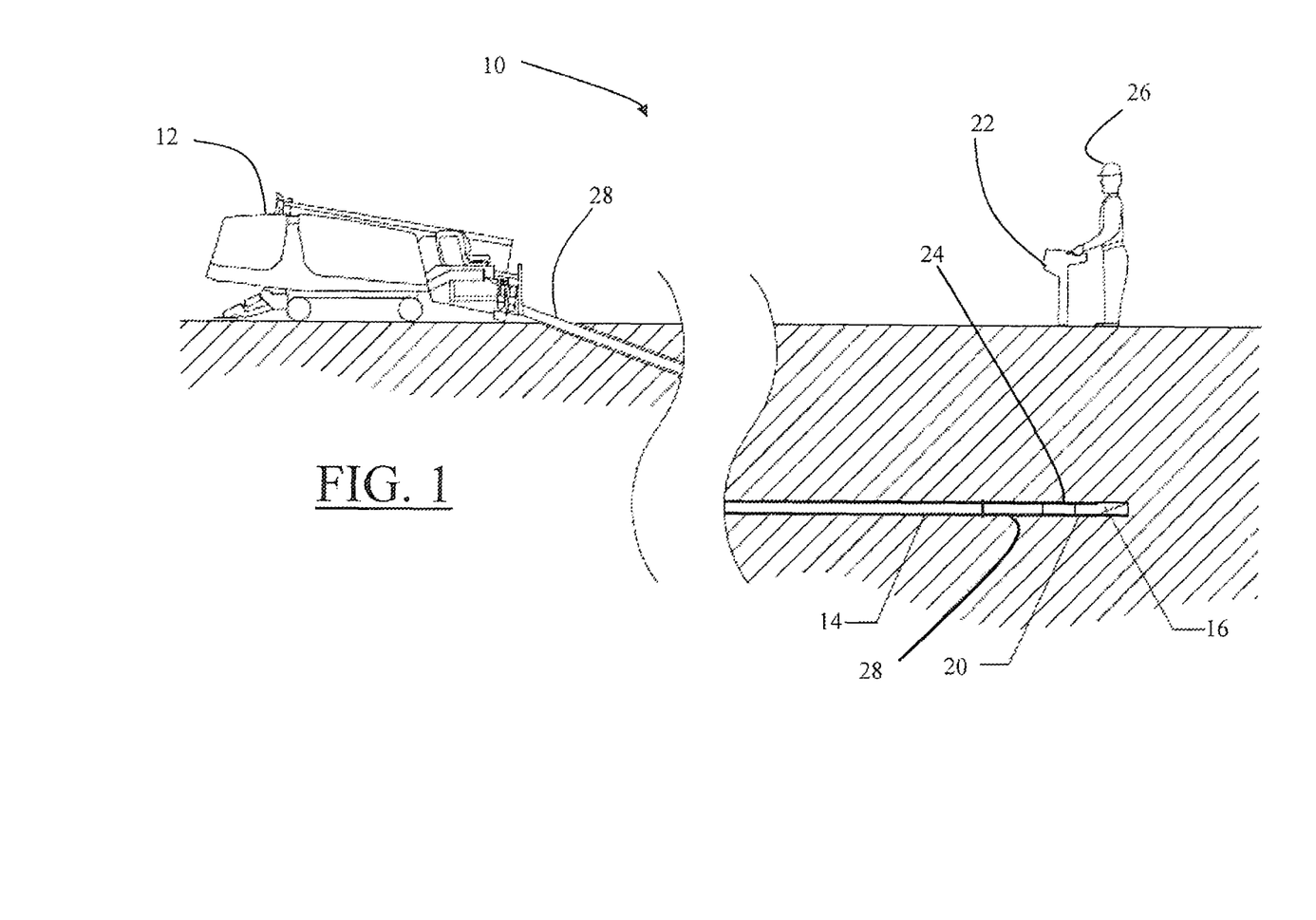
FIG. 1 is a diagrammatic representation of a horizontal directional drilling system showing the use of a drive machine, drill string, and drill bit supported at the downhole end of the drill string.

With reference to FIG. 1, there is shown therein a drilling system 10 constructed in accordance with the present invention. The drilling system 10 shown in FIG. 1 is an HDD system. However, one skilled in the art will appreciate that the sensor assembly of the present invention may be used in other forms of drilling such as vertical drilling. The HDD system 10 comprises a drive machine 12, a drill string 14, and a downhole tool assembly 16. The drill string 14 comprises a first end 18 and a second end 20. The first end 18 of the drill string 14 is operatively connected to the drive machine 12. The downhole tool assembly 16 is connected to the second end 20 of the drill string 14 for movement therewith.

A tracking receiver system 22 may be used to determine the position and orientation of the downhole tool assembly 16 using "walkover" techniques. For walkover tracking, a beacon 24 is disposed within the downhole tool 16 and adapted to transmit a magnetic field (not shown).

The drive machine 12 advances the drill string 14 and the downhole tool 16 through the ground. As referenced herein, a downhole tool 16 may be a boring tool for use during a boring operation or a backreamer for use in a backreaming operation. Though discussed primarily with regard to the boring operation, the apparatus and methods discussed herein are equally applicable to a backreaming operation. An operator 26 on the surface of the ground—utilizing the tracking receiver system 22—follows the beacon 24 and periodically determines the depth and direction of the downhole tool 16 utilizing techniques known in the art.

The drill string 14 may comprise a plurality of pipe sections connected end-to-end to form the elongate drill string shown in FIG. 1. The drive machine 12 is capable of adding pipe sections to the first end 18 of the drill string as the downhole tool assembly 16 and drill string are advanced through the ground. The drive machine 12 may also be capable of removing pipes sections from the drill string 14 as the drill string is pulled towards the drive machine. While the present invention is described herein with reference to a single pipe drill string and a boring tool having a single beacon 24, it will be appreciated that a dual-pipe drill system and tooling as disclosed in U.S. Pat. No. 6,827,158 may be utilized with the invention. Additionally, an alternative version of the two pipe system as disclosed in U.S. patent application Ser. No. 10/724,572 having a trailing second beacon may be used in accordance with the present invention.

Basic walkover style position and orientation sensing systems are described in U.S. Pat. No. 5,264,795 issued to Rider, U.S. Pat. No. 5,850,624 issued to Gard, et al., and U.S. Pat. No. 5,880,680 issued to Wisehart, et al., the contents of which are incorporated herein by reference. Sensors for determining the orientation of the downhole tool 16 are described in the latter two patents as well as in U.S. Pat. Nos. 5,133,417 and 5,174,033 issued to Rider and U.S. Pat. No. 5,703,484 issued to Bieberdorf, et al., the contents of which are also incorporated herein by reference.

Continuing with FIG. 1, there is shown a sensor system 28 disposed at a point along the drill string 14 to measure bend radius and torque force exerted on the drill string. Such a sensor assembly 28 may measure the torque force and bend radius on the drill string 14 during drilling operations in a manner described hereinafter. The data collected by the sensor system 28 may be transmitted to either the drive machine 12 or the tracking receiver system 22 for display to the drive machine operator (not shown) or the operator 26. Data may be transmitted from the sensor assembly 28 to the tracking receiver system 22 using the magnetic field transmitted by the beacon 24 and subsequently from the tracking receiver system to the drive machine 12 using a radio frequency communication system. Alternatively, data from the sensor system 28 may be transmitted directly to the drive machine 12 by either drill string telemetry or wire line telemetry systems.

Figure 2:
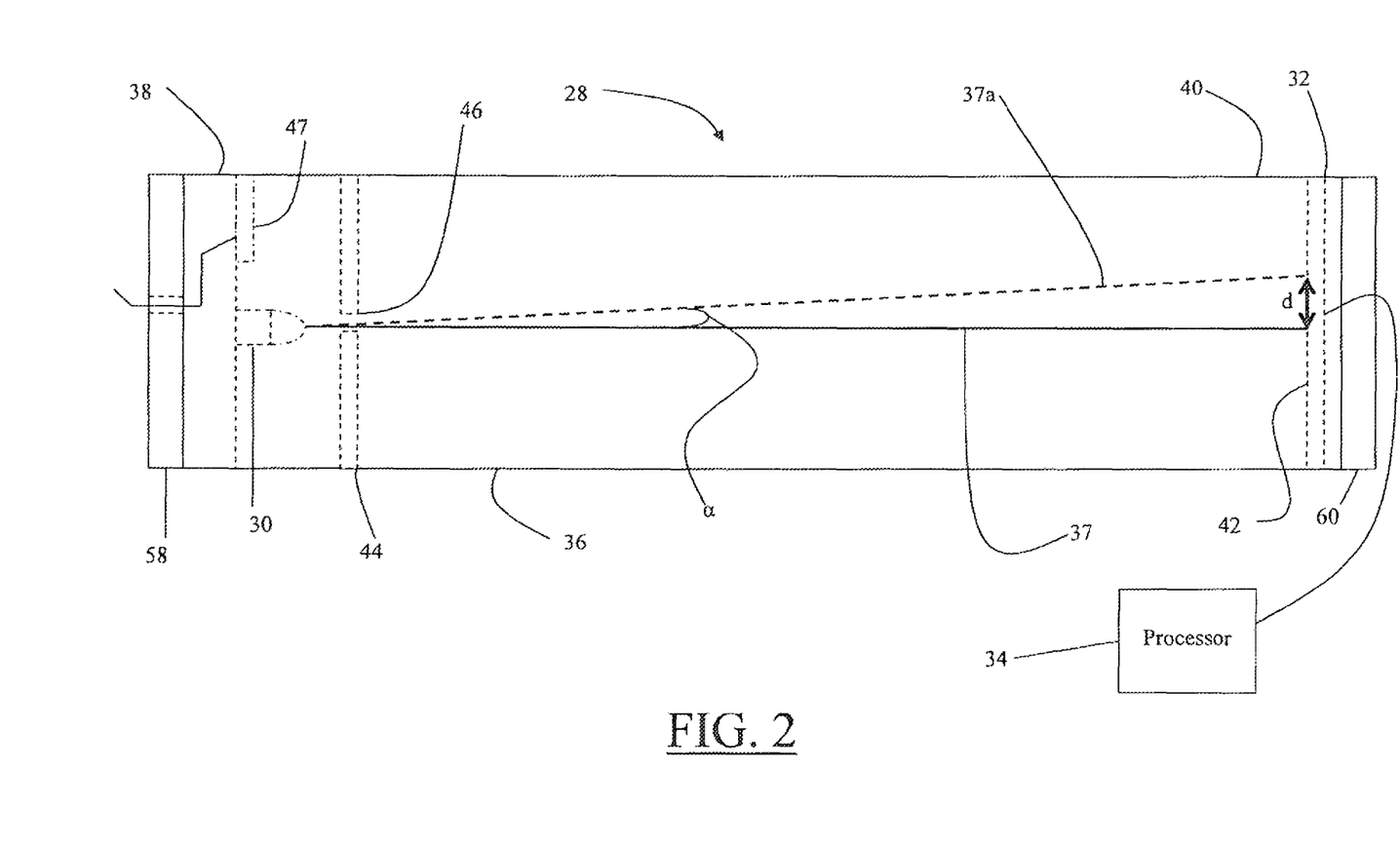
FIG. 2 illustrates a preferred embodiment of the sensor system of the present invention.

Turning now to FIG. 2, the sensor system 28 of the present invention is shown therein. The sensor system 28 comprises a light source 30, an optical sensing device 32, and a processor 34. An elongate cylindrical housing 36 having a first end 38 and a second end 40 may support the components of the system within the pipe section of the drill string 14 (FIG. 1). An acceptable housing 36 of the present invention may have a length of fifteen (15) inches and an inner diameter of 1.5 inches: One skilled in the art will appreciate that such dimensions are dependent upon the chosen use of the sensor system of the present invention and may be altered as appropriate. The light source 30 is supported within the pipe section within the housing 36 to emit a light beam 37 within the pipe section. The optical sensing device 32 is supported at the second end 40 of the housing 36 so that it is spaced apart from the light source 30. The optical sensing device 32 detects the light beam 37 and transmits a detection signal indicative of the position of the light beam on an imaging surface 42 of the optical sensing device. The processor 34 receives the detection signal and processes the signal to determine the forces exerted on the sensor assembly and thus the pipe section in a manner yet to be described.

The light source 30 may comprise a light emitting diode (LED) driven by a circuit board 47. Power may be provided the LED by a power supply cable passing through a first end cap 58. A second end cap 60 closes the second end 40 of the housing 36. The LED emits an incoherent light beam from the first end of the housing 36 to the second end 40. One skilled in the art will appreciate that other light emitting devices such as an electroluminescent panel, a liquid crystal panel, a vacuum florescent device, or an incandescent light source may be used in accordance with the present invention.

An optical mask 44 may be used to collimate the light from the LED 30. Thus, the mask 44 may be made from a generally opaque material and have an orifice such as a pin hole 46 formed to allow a portion of the light from the LED to pass along the housing 36 to the surface 42 of optical sensing device 32. The sensor system 28 may also comprise lens (not shown) to produce a magnified deviation of the light from the LED on the optical sensing device 32. The optical sensing device 32 of FIG. 2 may comprise a commercial two dimensional camera photoarray detector.

Figure 3A:
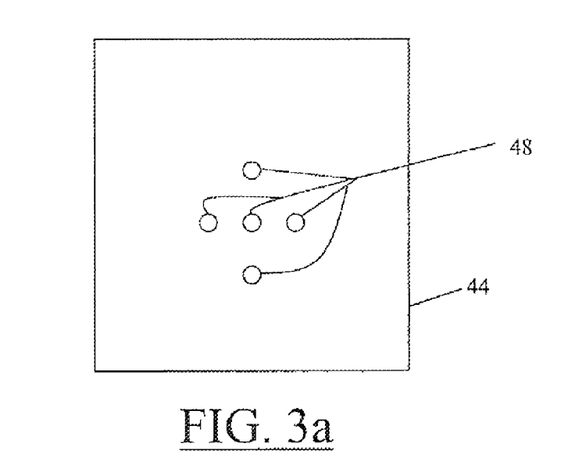
FIGS. 3a and 4a are alternative optical mask configurations for use with the sensor assembly shown in FIG. 2.
Figure 3B:
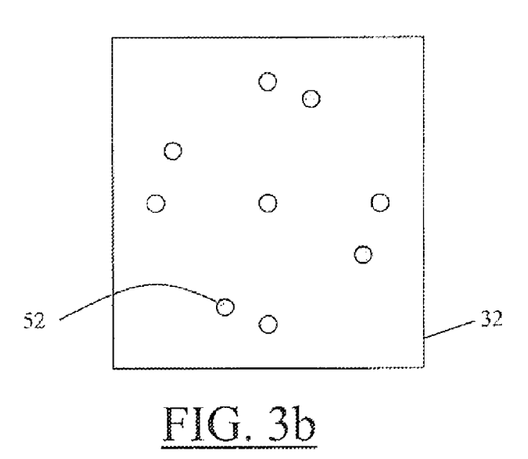
FIGS. 3b and 4b show alternative embodiments of the surface of the optical sensing device used in the sensor assembly of FIG. 2 showing the position of the light beam after is has passed through the optical masks shown in FIGS. 3a and 4a, respectively.
Figure 4A:
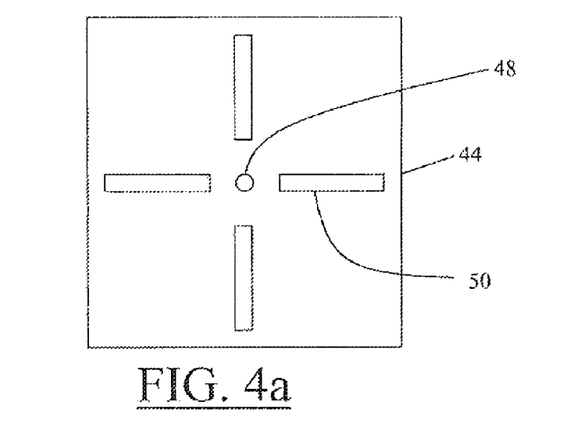

FIGS. 3a and 4a show alternative configurations of possible geometries of the optical mask 44 of FIG. 2. FIG. 3a illustrates an optical mask having an arrangement of pinholes 48 designed to cast the pinhole pattern shown in FIG. 3b and represented by white circles. FIG. 3b shows a representative pattern cast on the optical sensing device 32 when the sensor system 28, and thus the pipe section, are under bending and/or torquing loads. While the mask 44 has been described with reference to the existence of slots or orifices cut into the mask, one skilled in the art will appreciate that such orifices, holes or slots are not required. Rather, the optical mask 44 may comprise a flat substrate having an opaque layer deposited thereon. Precision cuts or etchings may then be made in the opaque layer to allow light to pass through locations wherein the opaque material has been removed. Furthermore, the specific geometry and number of light passages formed in the optical mask 44 may take several different forms without departing from the spirit of the invention. The number and geometry shown in FIGS. 3a and 4a are merely for illustrative purposes.

Figure 4B:
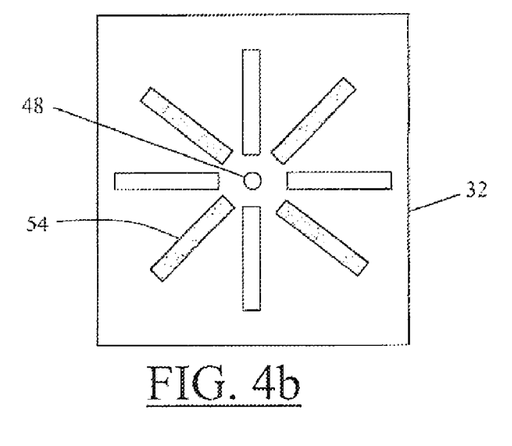

The pattern obtained after application of a torquing force, or rotational load, is represented by the shaded circles 52. FIG. 4a shows an alternative optical mask 44 pattern having a pinhole 48 formed at the center of the optical mask 44 and a series of slots 50 formed about the pinhole. FIG. 4b shows a representative pattern cast on the optical sensing device 32 when the sensor system, and thus the pipe section, moves in response to applied bending and/or torquing forces. The pattern obtained in response to a torquing force is represented by the shaded slots 54.

Returning to FIG. 2, the light beam 37 is emitted from the light source 30, passes through the optical mask 44, and is cast upon the optical sensing device 32. The light beam 37 is representative of the sensor assembly in alignment so that the light beam 37 falls on the center of the surface 42 of the optical sensing device 32. When a force is applied to the housing 36 via the pipe section the resulting deflection is shown by light beam 37a and results in displacement, d, of the light spot on the surface 42 of the optical sensing device 32. If the separation distance between the pinhole 48 and the surface 42 of the optical sensing device is L then the deflection angle, α, is given by:

$$\alpha = \sin^{-1}(d/L) \quad \text{[Equation 1]}$$

It is well known that, for small angles in radian measure, $\arcsin(\beta) \approx \beta$. Using this approximation, it may be shown the bend radius, R, is related to the deflection angle by:

$$R = L/2 \sin^{-1}(\alpha) \approx L^2/2d \quad \text{[Equation 2]}$$

where the deflection angle, α, is measured in radians. Distances L and d are usually given in inches, which results in R being in inches. Accordingly, this value may require conversion to feet.

In the event the pipe section is subject to a combination of torque forces and bending forces, the light beam cast upon the surface 42 of optical sensing device 32 will move across the surface by a displacement "d" in response to the bending force, as shown in FIG. 3b. Torque forces applied to the pipe section will produce relative rotation of the sensor system 28. This relative rotation may be detected using the pinhole configuration shown in FIG. 3a or the slot configuration shown in FIG. 4a. The relationship between torque applied to a uniform cylindrical object and the resultant rotation is given by the relationship:

$$\Theta = 583.6 Tl/G(D_o^4 - D_i^4) \quad \text{[Equation 3]}$$

where rotation angle θ is expressed in degrees, torque, T, is given in inch-pounds, l is the length of the pipe section in inches, $D_o$ and $D_i$ are the outer and inner diameters of the section in inches, and G is the shear modulus of rigidity in pounds per square inch (psi). The value for G for typical drill pipe steel is 11,500,000 psi. The applied torque may be calculated by the processor 34 using the relationship:

$$T = \Theta G(D_o^4 - D_i^4)/583.6 \, l \quad \text{[Equation 4]}$$

Figure 5:
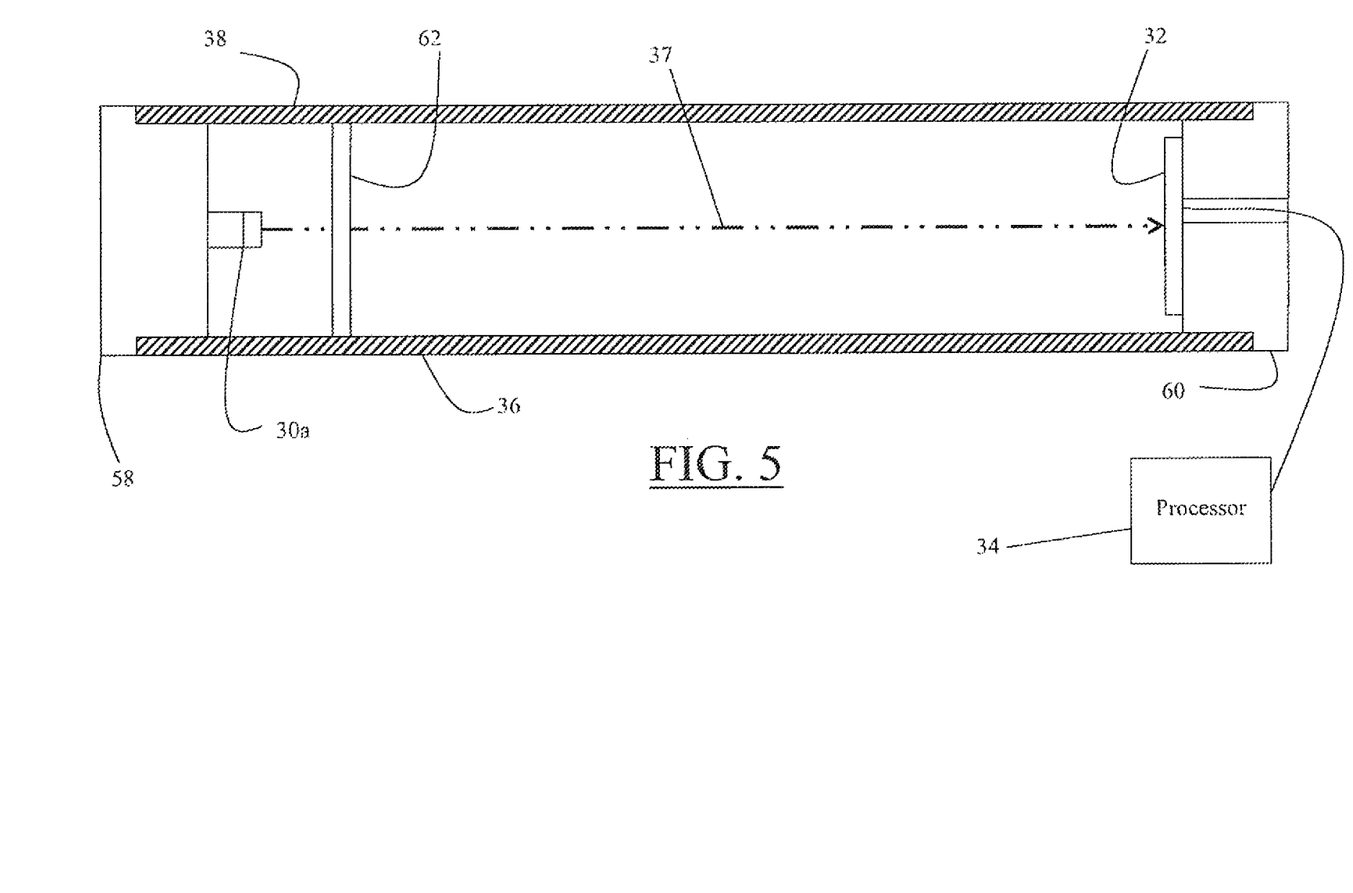
FIG. 5 is a diagrammatic representation of an alternative embodiment of the sensor assembly in which a laser emitting device comprises the light source.

Turning now to FIG. 5, in an alternative embodiment the light source 30a may comprise laser capable of emitting a laser beam 56. In contrast to the LED of FIG. 3, a laser 30a produces a coherent and collimated light without the need for the optical mask 44 or a lens. The laser 30a is supported within the housing 36 by a first end cap 58. The optical sensing device 32, may comprise a semiconductor photoarray such as a complementary metal-oxide semiconductor (CMOS) photoarray, and may be supported at a second end of the housing 36 by a second end cap 60. An acceptable CMOS photoarray device for use in the present invention is an AA9653, a small development board available from www.Electronics123.com, which features an OmniVision (Santa Clara, Calif.) OV9653 1.3 Mega Pixel CMOS imager. One skilled in the art will appreciate that the optical sensing device 32 may also comprise a plurality of one-dimensional linear photosensitive arrays. Linear arrays may be particularly useful in a sensor system 28 for detection of the X-Y coordinate location of a crosshair pattern intersection at the outer boundary of the image arrays.

An optical attenuator 62, typically comprising a semitransparent non-refractive medium, may be disposed between the light source 30a and the optical sensing device 32a. The function of the optical attenuator 62 is to reduce the intensity of the light beam reaching the imaging surface 42 of the photoarray 32. Introduction of the optical attenuator 62 is frequently necessary to prevent saturation, or flooding, of the photoarray 32. The optical attenuator 62 is preferably secured within the housing 36 proximate the light source 32 near the first end of the housing so that it is spaced apart from the imaging surface 42 of the photoarray 32. In the particular geometry of the preferred embodiment shown in FIG. 5, the optical attenuator 62 is positioned at a distance substantially one (1) inch from the light source 30 and at a distance of substantially ten (10) inches from the imaging surface 42 of the photoarray 32. Other geometries will require other separations; the dimensions given are for illustration only and are not limitations of the invention.

The use of an optical attenuator 62 is one solution to the problem of saturation, flooding, or overload of the imaging photoarray 32. However, an optical attenuator 62 is not the only solution to the problem of saturation, flooding, or overload of the photoarray or other optical sensor. It is contemplated that future embodiments of this invention will provide electronic means to control the amount of light emitted by light source 30, thereby optimally matching the light emitted by light source 30 to the dynamic range of the photoarray 32 selected for a given application. Various. acceptable embodiments of this contemplated control feature include, but are not limited to, control of the light source drive voltage and pulse-width modulation of the light source power connection. Other acceptable alternative embodiments include electronic control of polarized optical devices. Control of light intensity reaching the imaging surface 42 of the photoarray 32 is recognized to be a desirable feature which may be accomplished by a number of means to be selected as required by a particular application, all of which are considered to be within the scope of this invention.

End caps 58 and 60 may be threaded into the end of housing 36 or snap into place to secure the laser 30 and photoarray 32 in relative alignment. A processor 34 (FIG. 2) receives the detection signal from the photoarray and processes the signal to determine the bend and/or torque forces exerted on the pipe section.

Figure 6:
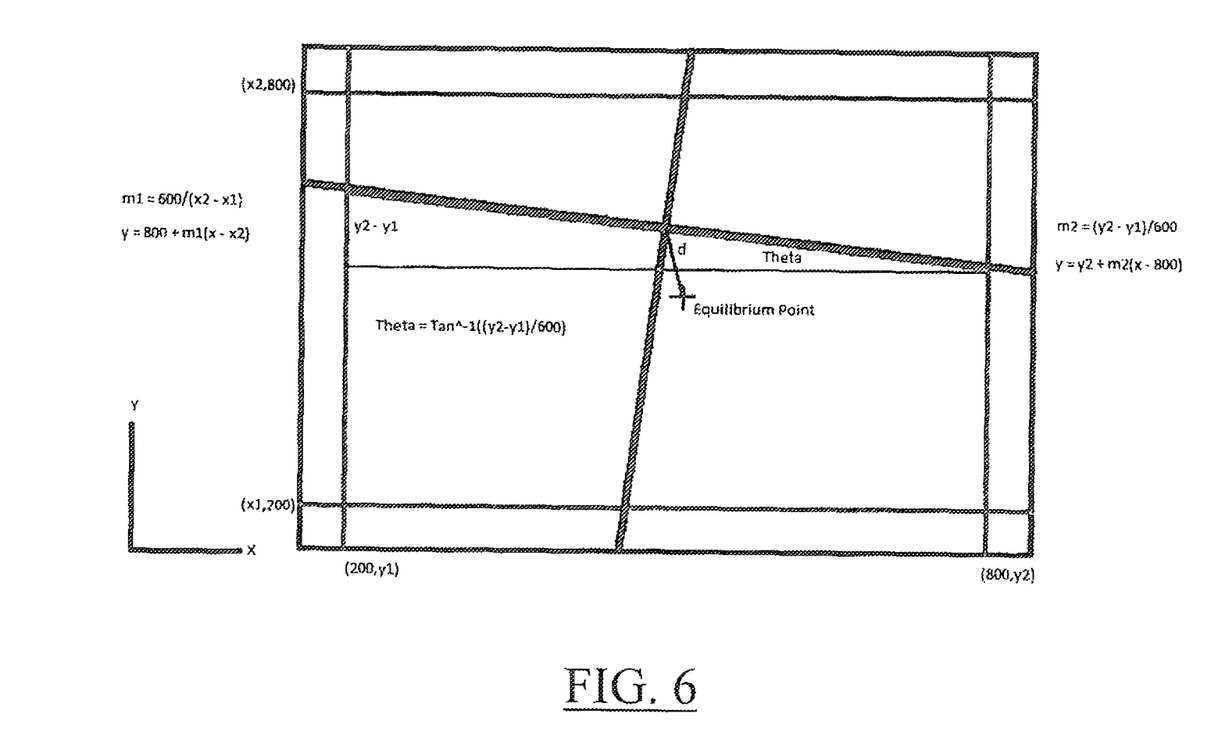
FIG. 6 shows the cross-hair pattern of the laser-based device of FIG. 5.

Several techniques may be used to determine the bend radius and torque force exerted on the drill string. A preferred process is a windowing technique which uses beam edge detection with pixel locations and geometry to determine the slope of the perpendicular beams that make up a cross hair laser beam. The cross hair beam may be used to calculate the angle of deflection and the center of the two perpendicular beams. Comparing these values with the same measurements taken at the start of the boring operation, when the drill string was not experiencing any external force, will provide the bend radius and torque. FIG. 6 illustrates the windowing technique.

An alternative process for determining bend and torque may include saving frame data from the photoarray 32 and using image-processing techniques to determine the bend radius and torque.

The photoarray 32 is operatively connected to the processor 34 to send the detection signal to the processor. One skilled in the art will appreciate that the detection signal of the present embodiment may comprise all or a windowed portion of the photoarray surface. The processor may comprise a 16-bit 25 MHz micro-controller unit (MCU) utilizing serial peripheral interface bus communication for controls and initialization. The MCU 34 will instruct the photoarray 32a to send specified regions, or windows, of the total imaging area. The photoarray 32a will transfer its windowed image data over an 8-bit bus to the MCU. The MCU will then store this data to memory on chip and then determine torque and bend of the pipe section.

The MCU 34 may be programmed to initialize the photoarray 32a and use the process described below to find the angle of deflection and center of the illuminated optical pattern when it is at equilibrium, or otherwise not experiencing any external forces.

The process of finding the angle of deflection and center point may begin by the MCU 34 gathering a complete or a windowed data set from a range of columns or rows in the pixel array of the photoarray 32a. The collected data is then tested against a set of threshold values. If a given pixel value is greater than a predetermined threshold value, that pixel is considered to be illuminated by the source pattern. Assume the source pattern is an illuminated crosshair pattern. The first time the threshold is exceeded in a row or column scan, it is determined that an edge of a crosshair beam has been detected. The pixel location where the edge was detected is then stored. The MCU will keep reading values for that set of columns or rows until the other edge of the crosshair beam is detected. This occurs when the threshold value is no longer exceeded. A given row or a given column may contain illuminated image cells (picture elements, or pixels) from more than one crosshair. Assuming the source pattern is known to be a set of crosshairs, it is known a priori that the image pattern must consist of two linear features whose slopes are negative inverses. This information may be used to mathematically define the crosshair lines, to define the pixel (or pixels) located at their intersection, and to extract other information related to the position of the crosshairs and the torque responsible for their orientation.

Pixel dimensions, determined by individual cell dimensions on the photoarray 32, are very small and the width of apertures, slits, orifices, or other features used to form the source array are relatively large in relationship to the dimensions of a single pixel. Thus, the result of a row or column scan across the image (or across a windowed image) is likely to return more than one pixel location. The physical origin of a multi-pixel line width is well understood, but the mathematical solutions for line equations, line intersections, and rotation angle determinations make it necessary to model observed image data as if the linear features are very small compared to pixel dimensions. For this reason, the center of each crosshair beam is considered to be the average of the two edge pixels as determined in the preceding paragraph. This determination may be made using only the illuminated pixels at the extreme edges of the image window, or it can be determined on a line-by-line or column-by-column basis as a matter of design choice at the option of the software developer.

Actual forces acting on the sensor may be considered as the superposition of two different types of force: a bending force assumed to be normal to the sensor tube wall producing a simple translation of the crosshairs, and a force couple (torquing or torsional force) which produces rotation of the crosshairs about a central point called the center of rotation. Incremental changes in bending and rotation may be determined from two photoarray data sets taken at different times.

Determination of bend radius and rotation may be done independently, although it may be possible to find a solution in a computational single step. As an example, consider two photoarray images acquired at different times. Let the earlier time be denoted time1 and let the later time be denoted time2. Those skilled in the software arts will appreciate that a number of algorithms can be found to extract the crosshair slopes, the common crosshair midpoint, and the relative angle of rotation of the crosshairs about the common crosshair midpoint. We assume the crosshair slopes, the common crosshair midpoint, and the relative angles of rotation of the crosshairs about the common crosshair midpoint have been computed for the images taken at time1 and time2. Any algorithm performing the required steps is considered within the scope of this invention.

A displacement of the common crosshair midpoint will be produced by a force applied normal to the sensor (and, as noted, the midpoint will move in the direction opposite the direction of the force). The displacement d separating the common crosshair midpoints of the two images is readily determined from knowledge of the pixels locations corresponding to the midpoints. The amount of physical movement can be determined from knowledge of physical cell geometry on the imaging device. The displacement thus determined, and knowledge of the sensor geometry, is sufficient information to compute the incremental change in bend radius R using calculations similar to those in Equation 2.

All illuminated points in the measurement space move the same distance and in the same direction in a pure translational displacement. A torquing force couple, if equal at time1 and time2, would produce equal rotations. Because an assumed bending force produces a translation, equal torquing force couples would result in equal angular rotations, but about a different center. The consequence is that the crosshairs of two equal torquing force couples in the time1 and time2 images would be parallel to one another if the two images were superimposed. The difference in the relative angle of crosshair rotation is a result of the incremental change in torque applied between time1 and time2; the amount of the incremental change is readily computed using knowledge of sensor geometry and shear modulus of rigidity using the relationship given in Equation 4.

As noted, a variety of algorithms are possible. Measurements taken without the application of force on the sensor system may be compared to the determined values at any point in time to find the instantaneous total angle of deflection and distance from the equilibrium center relative to the initial reading. Equation 1 above may be used to find the angular displacement. If the drill string is rotating while experiencing a bending force, the common crosshair midpoint will describe a circle in the image space. The radius of the common midpoint circle will be the displacement needed to determine angular displacement; allowing Equation 2 to be used to determine the bend radius. Equation 4 is used to determine the torquing couple exerted on the pipe section from a measure rotation. The processor determines these values and transmits them to a user display. The display may provide the operator with an indication of how close he or she is to exceeding the bend or torque limitations of the pipe section The present invention is also directed to a method for determining bend radius and torque forces exerted on a pipe section during drilling operations. The method includes transmitting the light beam 37 from a light source 30 disposed within a first end of the pipe section and detecting the light beam with a photoarray 32 or other optical sensing device supported within the second end of the pipe section. The photoarray 32 generates a detection signal indicative of the position of the light beam on the optical sensing device and transmits the detection signal to a processor 34. The processor 34 uses the detection signal to determine the torque on or bend radius of the pipe section. The torque and bend radius may then be displayed on a display device at the tracker receiver 22 or the drive machine 12.

In accordance with the present invention the light source 30 may comprise an LED or laser emitting device and the optical sensing device may comprise a photoarray such as a CMOS imaging array typical of those used in digital cameras and small cellular telephones. In an embodiment of the present invention the light beam emitted from the LED 30 is transmitted through an optical mask 44 comprising at least one orifice 46 before it impinges the photoarray or other optical sensing device 32.

The method of the present invention may further include detecting the cross-hair pattern emitted from a laser light source 30a. In such a method generating the detection signal indicative of the position of the light beam 37 on the optical sensing device 32 comprises following movement of the cross-hair laser beam across the surface of the optical sensing device.

Figure 7:
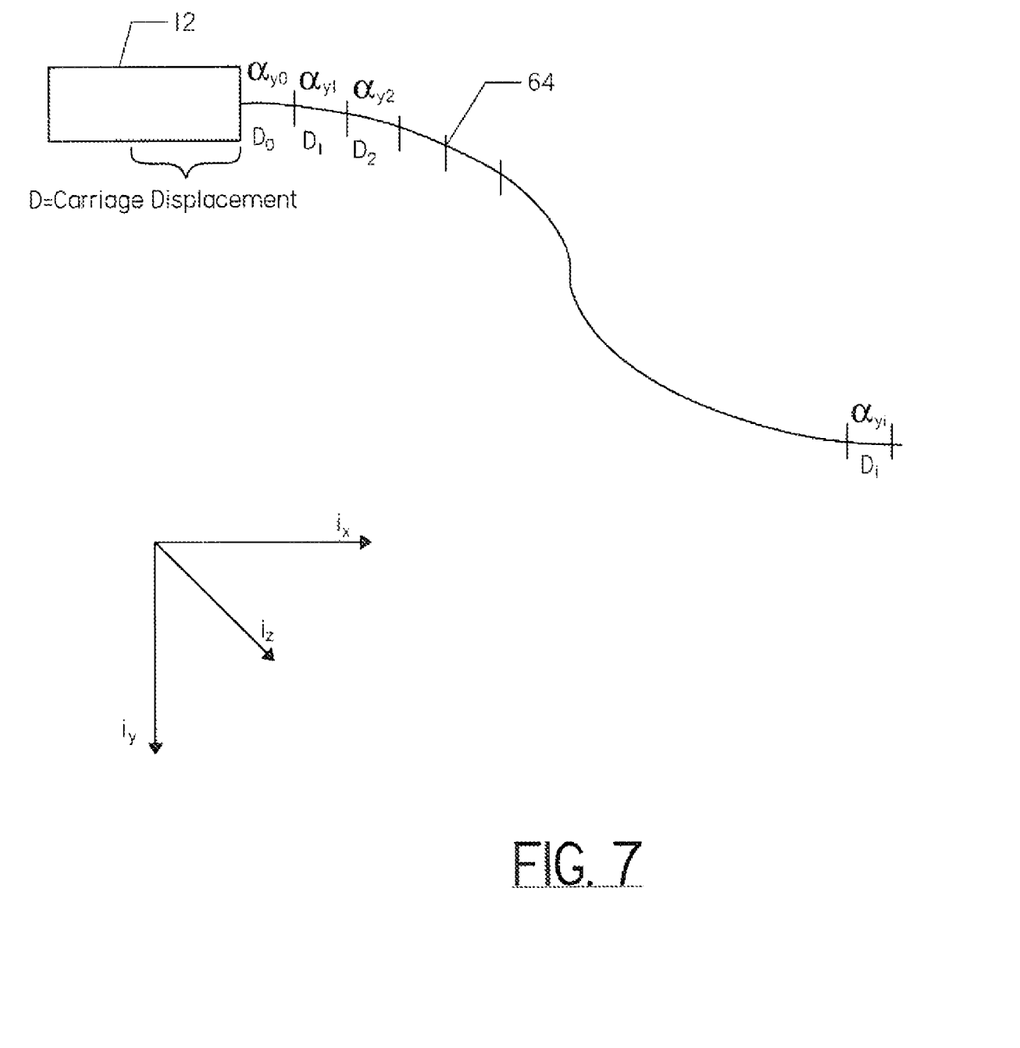
FIG. 7 is a diagrammatic representation of the drilling geometry conventions used to obtain navigation and position information from the sensor system of the present invention.

Turning now to FIG. 7, the sensor system 28 of the present invention may be useful in navigating the downhole tool assembly 16 through the ground. Navigation of the downhole tool assembly 16 may be accomplished using data comprising bend angle, pitch and roll position of the downhole tool 16, and the drill string's linear displacement. Bend angle data may be obtained from the sensor system 28 of the present invention. Pitch and roll data may be obtained from one or more accelerometers (not shown) carried by the beacon 24. The drill path is determined by the continual sum of individual incremental measurements over the length of the bore.

Referring still to FIG. 7, a plan view of a drive machine 12 and bore path 64 are shown therein. Three mutually orthogonal direction vectors define a Cartesian measurement space given with respect to machine orientation. The positive x-axis direction, represented by unit vector $\bar{i}_x$, is horizontal and directly forward when viewed from the rear of the drilling machine, The positive y-axis direction, $\bar{i}_y$, is horizontal and to the right when viewed from the rear of the drive machine 12. The positive z-axis direction, $\bar{i}_z$, is vertical and down when viewed from the rear of the drive machine 12. The Cartesian measurement space thus defined has a conventional right-hand orientation. Further assume each piece of drillpipe has incremental length $D_n$. Bend angle data from the sensor system 28 of the present invention may be resolved into horizontal and vertical bend angle components ($\alpha_y$ and $\alpha_z$, respectively) using information from one or more accelerometers (not shown) carried by the beacon 24 (FIG. 1). For example, deviation of the bore path 64 from the initial trajectory (relative to the initial direction vector of the drillstring and the initial pitch of the drillstring at entry) in plan view (viewed from above, or in the horizontal plane) may be determined in the x-y plane by the following equation:

$$f(x,y) = \Sigma_{n=0} [D_n \cos(\alpha_{y,n}) \cos(101_n) \bar{i}_x + D_n \sin(\alpha_{y,n}) \cos(\Phi_n) \bar{i}_y]$$   [Equation 5]

where D represents drill string length, $\alpha_y$ represents the horizontal component of bend angle in the $\bar{i}_y$ direction, $\alpha_z$ represents the vertical component of bend angle in the $\bar{i}_z$ direction, and cp represents the pitch angle.

Various modifications can be made in the design and operation of the present invention without departing from its spirit. Thus, while the principal preferred construction and modes of operation of the invention have been explained in what is now considered to represent its best embodiments, it should be understood that within the scope of the appended claims, the invention may be practiced otherwise than as specifically illustrated and described.

What is claimed is:

1. A system for monitoring a force exerted on a pipe section, the system comprising:
    a light emitting diode supported within the pipe section to emit light within the pipe section;
    an optical sensing device supported within the pipe section and spaced apart from the light emitting diode;
    an optical mask disposed within the pipe section between the light emitting diode and the optical sensing device, wherein the optical mask comprises an orifice to allow a light beam to pass through the mask, and wherein the mask blocks any remaining light from the light emitting diode;
    wherein the optical sensing device transmits a detection signal indicative of the position of the light beam on a surface of the optical sensing device; and
    a processor for receiving the detection signal and processing the detection signal to determine the force exerted on the pipe section.

2. The system of claim 1 wherein the force exerted on the pipe section produces a torque or bend radius change.

3. The system of claim 1 wherein the pipe section comprises a pipe section of a horizontal directional drill string.

4. The system of claim 1 wherein the optical sensing device comprises a photo array detector.

5. The system of claim 1 wherein the optical mask comprises a plurality of slots spaced equally about the optical mask and surrounding the orifice.

6. The system of claim 1 wherein the optical mask comprises a plurality of orifices to allow a plurality of light beams through the mask.

7. The system of claim 1 wherein the optical mask further comprises a slot.

8. The system of claim 1 further comprising a housing having a first end and a second end, wherein the housing is formed to fit within the pipe section and to support the light emitting diode at the first end and the optical sensing device at the second end.

9. The system of claim 8 further comprising a first end cap and a second end cap, wherein the light emitting diode is supported at the first end by the first end cap and the optical sensing device is supported at the second end by the second end cap.

10. The system of claim 1 wherein the optical mask comprises a plurality of slots arranged in a cross-hair feature.

11. A system for monitoring a force exerted on a pipe section, the system comprising:
    an elongate cylindrical housing having a first end and a second end;
    a light source supported at the first end of the housing to emit a laser beam within the housing;
    a semiconductor array disposed at the second end of the housing to detect the laser beam, wherein the array transmits a detection signal indicative of the position of the laser beam on a surface of the array; and
    a controller to limit the drive voltage and pulse-width modulation of the light source within a dynamic range of the semiconductor array to prevent saturation, flooding, or overload of the semiconductor array.

12. The system of claim 11 wherein the laser beam comprises a cross-hair feature.

13. The system of claim 11 further comprising a first end cap and a second end cap, wherein the light source is supported at the first end of the housing by the first end cap and the array is supported at the second end of the housing by the second end cap.

14. A directional drilling system comprising:
    a drive machine;
    a drill string comprising a first end and a second end, wherein the first end is operatively connected to the drive machine;
    a downhole tool assembly connected to the second end of the drill string for movement therewith;
    a sensor system disposed along the drill string to measure bend radius and torque force exerted on the drill string; the sensor system comprising:

a light source supported within the pipe section to emit light within the pipe section; and an optical sensing device supported within the pipe section and spaced apart from the light source;

an optical mask disposed within the pipe section between the light source and the optical sensing device, wherein the optical mask comprises an orifice to allow a light beam to pass through the mask and reach the optical sensing device, and wherein the mask blocks any remaining light from the light source from reaching the optical sensing device;

wherein the optical sensing device transmits a detection signal indicative of the position of the light beam on a surface of the optical sensing device; and a processor for receiving the detection signal and processing the detection signal to determine the forces exerted on the pipe section.

15. The directional drilling system of claim 14 wherein the drill string comprises a plurality of pipe sections, wherein the sensor assembly is secured within a pipe section proximate the second end of the drill string.

16. The directional drilling system of claim 15 wherein the sensor system further comprises a housing having a first end and a second end, wherein the housing is formed to fit within the pipe section to support the light source at the first end and the optical sensing device at the second end.

17. The directional drilling system of claim 16 further comprising a first end cap and a second end cap, wherein the light source is supported at the first end by the first end cap and the optical sensing device is supported at the second end by the second end cap.

18. The directional drilling system of claim 14 wherein the light source comprises a light emitting diode.

19. The directional drilling system of claim 14 wherein the optical sensing device comprises a photo array detector.

20. The directional drilling system of claim 14 wherein the mask comprises a plurality of slots disposed about the orifice.

21. The directional drilling system of claim 14 wherein the optical mask comprises a plurality of orifices to create a plurality of light beams.

22. The directional drilling system of claim 21 wherein the optical mask farther comprises a slot.

23. The directional drilling system of claim 14 wherein the mask comprises a plurality of slots to make a cross-hair feature.

24. The directional drilling system of claim 14 wherein the optical sensing device comprises a semiconductor array.

25. A method for determining bend radius and torque forces exerted on a pipe section during drilling operations, the method comprising:

transmitting a light from a light source disposed within the pipe section;

providing n optical mask disposed between the light source and an optical sensing device, the mask having an orifice to allow a beam of the light to pass through the mask and wherein the mask restricts the remaining light from reaching the optical sensing device;

detecting the light beam with the optical sensing device supported within the pipe section;

generating a detection signal indicative of the position of the light beam on the optical sensing device;

transmitting the detection signal to a processor; and processing the detection signal to determine the torque force or bend radius of the pipe section.

26. The method of claim 25 wherein the optical mask is configured to allow a plurality of light beams to pass through the mask in a cross-hair feature.

27. The method of claim 26 wherein movement of the plurality of light beams on the optical sensing device is detected and processed by a microprocessor to determine the bend radius or torque force exerted on the pipe section.

28. The method of claim 26 further comprising detecting a plurality of cross-hair edges on the optical sensing device.

29. The method of claim 28 wherein generating a detection signal indicative of the position of the light beam on the optical sensing device comprises following movement of the cross-hair feature across a surface of the optical sensing device.

30. The method of claim 25 wherein the optical mask has a plurality of orifices.

31. The method of claim 25 wherein both the torque force and bend radius are determined.

32. The method of claim 25 further comprising displaying the torque force or bend radius on a display device remote from the pipe section.

* * * * *

UNITED STATES PATENT AND TRADEMARK OFFICE
CERTIFICATE OF CORRECTION

PATENT NO. : 8,833,183 B2  Page 1 of 1
APPLICATION NO. : 13/165418
DATED : September 16, 2014
INVENTOR(S) : Blessum et al.

It is certified that error appears in the above-identified patent and that said Letters Patent is hereby corrected as shown below:

In the Specification

Column 5, line 37, please delete "$T=\theta G(D_o^4 D_i^4)/583.6\ 1$" and substitute therefore --$T=\theta G(D_o^4 D_i^4)/583.6l$--.

Column 9, lines 45-46, please delete

" $f(x,y)=\Sigma_{n=0}[D_n \cos(\alpha_{yn}) \cos(101_n)\bar{i}_x + D_n \sin(\alpha_{yn}) \cos(\Phi_n)\bar{i}_y]$ "

and substitute therefore

-- $f(x,y)=\sum_{n=0}[D_n \cos(\alpha_{yn})\cos(\phi_n)\bar{i}_x + D_n \sin(\alpha_{yn})\cos(\phi_n)\bar{i}_y]$ --.

Column 9, line 50, please delete "cp" and substitute therefore --$\phi$--.

In the Claims

Column 11, line 43, please delete "farther" and substitute therefore --further--.

Column 12, line 11, please delete "n" and substitute therefore --an--.

Signed and Sealed this
Third Day of February, 2015

Michelle K. Lee
*Deputy Director of the United States Patent and Trademark Office*